United States Patent
Ye et al.

(10) Patent No.: US 10,142,586 B2
(45) Date of Patent: Nov. 27, 2018

(54) FRONT-END AND BACK-END PROCESSING CIRCUITS AND POC CIRCUIT

(71) Applicant: Hangzhou Hikvision Digital Technology Co., Ltd, Hangzhou (CN)

(72) Inventors: Min Ye, Hangzhou (CN); Liang Zhang, Hangzhou (CN); Mingling Luo, Hangzhou (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 15/536,955

(22) PCT Filed: Jun. 17, 2015

(86) PCT No.: PCT/CN2015/081689
§ 371 (c)(1),
(2) Date: Jun. 16, 2017

(87) PCT Pub. No.: WO2016/127537
PCT Pub. Date: Aug. 18, 2016

(65) Prior Publication Data
US 2017/0347062 A1    Nov. 30, 2017

(30) Foreign Application Priority Data
Feb. 9, 2015 (CN) .......................... 2015 1 0067441

(51) Int. Cl.
*H04N 7/10* (2006.01)
*H04B 3/54* (2006.01)
(Continued)

(52) U.S. Cl.
CPC ............. *H04N 7/102* (2013.01); *H04B 3/548* (2013.01); *H04N 5/14* (2013.01); *H04N 5/38* (2013.01);
(Continued)

(58) Field of Classification Search
CPC . H04N 7/102; H04N 5/14; H04N 5/38; H04B 3/548; H04B 2203/547; H04B 2203/5487
(Continued)

(56) References Cited

U.S. PATENT DOCUMENTS

| 4,205,269 | A | * | 5/1980 | Watanabe | ................ | H03G 1/02 |
| | | | | | | 455/232.1 |
| 4,276,588 | A | * | 6/1981 | McLyman | ............ | H02H 7/1213 |
| | | | | | | 363/24 |
| 2013/0187445 | A1* | | 7/2013 | Mutzabaugh | .......... | H04B 3/548 |
| | | | | | | 307/1 |

FOREIGN PATENT DOCUMENTS

| CN | 201336690 | 10/2009 |
| CN | 201336690 Y | 10/2009 |

(Continued)

OTHER PUBLICATIONS

International Search Report for International Patent Application No. PCT/CN2015/081689 dated Nov. 13, 2015 (English language translation attached).

(Continued)

*Primary Examiner* — Michael Lee
(74) *Attorney, Agent, or Firm* — Moore & Van Allen PLLC; Henry B. Ward, III

(57) ABSTRACT

The disclosure discloses a back-end circuit for processing an analog video signal and direct current power, a front-end circuit for processing an analog video signal and direct current power and a Power Over Coaxia (POC) circuit for an analog video signal. Each of the back-end processing circuit and the front-end processing circuit includes an analog video signal passing circuit configured to block the direct current power and let the analog video signal pass and a direct current power passing circuit configured to block the analog video signal and let the direct current power pass, so that the analog video signal may be isolated from the direct current (Continued)

power and the analog video signal may be superimposed to the direct current power without mutual influence and exclusion to realize a function of superimposing the direct current power on an analog high-definition video cable.

16 Claims, 6 Drawing Sheets

(51) Int. Cl.
*H04N 5/14* (2006.01)
*H04N 5/38* (2006.01)

(52) U.S. Cl.
CPC ......... *H04N 7/10* (2013.01); *H04B 2203/547* (2013.01); *H04B 2203/5487* (2013.01)

(58) Field of Classification Search
USPC .......................................................... 348/571
See application file for complete search history.

(56) References Cited

FOREIGN PATENT DOCUMENTS

| | | |
|---|---|---|
| CN | 201611926 U | 10/2010 |
| CN | 201821448 U | 5/2011 |
| CN | 201957016 | 8/2011 |
| CN | 202918413 U | 5/2013 |
| CN | 104702879 A | 6/2015 |
| WO | WO 2013043661 | 3/2013 |

OTHER PUBLICATIONS

Written Opinion for Internationai Patent Application No. PCT/CN2015/081689 dated Nov. 13, 2015.

Supplementary European Search Report for EP Application No. 15881698 date of completion May 4, 2018, dated May 17, 2018.

* cited by examiner

FRONT-END AND BACK-END PROCESSING CIRCUITS AND POC CIRCUIT

TECHNICAL FIELD OF THE DISCLOSURE

The disclosure relates to the field of power supply, and in particular to a back-end circuit for processing an analogue video signal and direct current power, a front-end circuit for processing an analogue video signal and direct current power and a Power Over Coaxia (POC) circuit for an analogue video signal.

BACKGROUND OF THE DISCLOSURE

In a transmission process on a coaxial cable, an analogue video signal (including a high-definition analogue video signal) and a coaxial signal are required to be transmitted, power is also required to be transmitted, that is, signals (such as the analogue video signal and the coaxial signal) and power of a power supply are composed and transmitted on a coaxial cable. Engineering cabling adopting such a transmission manner may considerably reduce cost and shorten construction time. Power Over Ethernet (POE) may implement power supply over the Ethernet through 10 BASE-T, 100 BASE-TX and 1000 BASE-T, reliably implements power supply of a centralized power supply, and is convenient to be used, and power may be supplied to a network terminal merely by virtue of a network cable without an external power supply. This technology is widely applied at present, may transmit a data signal for an Internet Protocol (IP)-based terminal, and can also provide direct current power for such equipment. A POE solution for transmitting a network signal and power together on a network cable makes a transmission process digitalized and networked, and ensures high transmission reliability. However, such a solution also has some defects, for example: first, the POE solution is used to transmit network data, and an image is required to be digitalized before transmission, so that cost is relatively high; and second, numerous coaxial cables are used in a monitoring field at present, so that the POE solution is infeasible.

SUMMARY OF THE DISCLOSURE

The disclosure is intended to provide a back-end circuit for processing an analogue video signal and direct current power, a front-end circuit for processing an analogue video signal and direct current power and a POC circuit for an analogue video signal, and the back-end processing circuit and the front-end processing circuit are electrically connected with two ends of a coaxial cable respectively to simultaneously transmit direct current power and the analogue video signal on the coaxial cable, thus not only reducing cost but also shortening construction time.

According to an aspect of the disclosure, a back-end circuit for processing an analogue video signal and direct current power is provided, comprising: an analogue video signal passing circuit configured to block the direct current power and let the analogue video signal pass, and a direct current power passing circuit configured to block the analogue video signal and let the direct current power pass, wherein the analogue video signal passing circuit comprises a capacitor C2, the direct current power passing circuit comprises a diode D2 and an inductor L2, one end of the capacitor C2 is connected with a video signal end, the other end of the capacitor C2 is connected with one end of the inductor L2 and an anode of the diode D2 respectively, and both the other end of the inductor L2 and a cathode of the diode D2 are connected with a power input end.

In an example embodiment, the anode of the diode D2 is further connected with a matching circuit, the matching circuit is a termination matching circuit, and the termination matching circuit comprises a Thevenin termination matching circuit and an RC termination matching circuit.

In an example embodiment, the video signal end is further connected with a video processing circuit, the video processing circuit comprises a video Analogue/Digital (A/D) conversion circuit and a low-pass filter, one end of the low-pass filter is connected with the video A/D conversion circuit, and the other end of the low-pass filter is connected with one end of the capacitor C2.

In an example embodiment, the cathode of the diode D2 is further connected with a superimposed circuit configured to implement high impedance to the analogue video signal, the superimposed circuit comprises a capacitor, a triode and a resistor, and when the triode is in an amplification state, high impedance to the analogue video signal is implemented by utilizing a characteristic that the capacitor presents low impedance to an alternating current signal and adopting resistors with different resistances.

In an example embodiment, further comprising: a superimposed circuit, connected between the direct current power passing circuit and the direct current power, and configured to implement high impedance to the analogue video signal, wherein the superimposed circuit comprises a capacitor, a triode and a resistor, and when the triode is in an amplification state, high impedance to the analogue video signal is implemented by utilizing a characteristic that the capacitor presents low impedance to an alternating current signal and adopting resistors with different resistances.

In an example embodiment, the superimposed circuit comprises a resistor R4, a capacitor C1, a triode Q3, a resistor R5, a triode Q4 and a resistor R6, one end of the resistor R4 is connected with a power input end, a collector of the triode Q3 and a collector of the triode Q4 respectively, the other end of the resistor R4 is connected with one end of the capacitor C1 and a base of the triode Q3 respectively, an emitter of the triode Q3 is connected with one end of the resistor R5 and a base of the triode Q4 respectively, an emitter of the triode Q4 is connected with one end of the resistor R6, and the other end of the capacitor C1 is connected with the other end of the resistor R5, the other end of the resistor R6 and the cathode of the diode D2 respectively.

In an example embodiment, the superimposed circuit comprises a resistor R4, a capacitor C1, a triode Q3, a resistor R5, a triode Q4 and a resistor R6, one end of the resistor R4 is connected with a power input end, a collector of the triode Q3 and a collector of the triode Q4 respectively, the other end of the resistor R4 is connected with one end of the capacitor C1 and a base of the triode Q3, an emitter of the triode Q3 is connected with one end of the resistor R5 and a base of the triode Q4 respectively, an emitter of the triode Q4 is connected with one end of the resistor R6, the other end of the capacitor C1 is connected with the anode of the diode D2 and the other end of the resistor R5 respectively, and the other end of the resistor R6 is connected with the cathode of the diode D2.

In an example embodiment, the superimposed circuit comprises a resistor R4, a capacitor C1, a triode Q3, a resistor R5, a triode Q4 and a resistor R6, one end of the resistor R4 is connected with a power input end, a collector of the triode Q3 and a collector of the triode Q4 respectively, the other end of the resistor R4 is connected with one end of the capacitor C1 and a base of the triode Q3 respectively, an emitter of the triode Q3 is connected with one end of the resistor R5 and a base of the triode Q4 respectively, an emitter of the triode Q4 is connected with one end of the resistor R6, the other end of the capacitor C1 is connected with the anode of the diode D2, and the other end of the resistor R5 is connected with the other end of the resistor R6 and the cathode of the diode D2 respectively.

In an example embodiment, the superimposed circuit comprises a capacitor C21, a resistor R21, a resistor R23, a resistor R24, a triode Q21, a triode Q22 and a resistor R22, one end of the capacitor C21 is connected with a power input end, one end of the resistor R21, one end of the resistor R23 and one end of the resistor R24 respectively, the other end of the capacitor R21 is connected with the other end of the resistor R21, a base of the triode Q21 and one end of the resistor R22 respectively, an emitter of the triode Q21 is connected with the other end of the resistor R23 and a base of the triode Q22 respectively, an emitter of the triode Q22 is connected with the other end of the resistor R24, and the other end of the resistor R22 is connected with a collector of the triode Q21, a collector of the triode Q22 and the cathode of the diode D2 respectively.

In an example embodiment, the cathode of the diode D2 is further connected with an over-current protection circuit, the over-current protection circuit comprises a resistor R1, a triode Q1, a triode Q2, a resistor R2, an adjustable precision voltage regulator D1 and a resistor R3, one end of the resistor R1 is connected with a power input end, a collector of the triode Q1 and a collector of the triode Q2 respectively, an emitter of the triode Q1 is connected with a base of the triode Q2 and one end of the resistor R2 respectively, an emitter of the triode Q2 is connected with the other end of the resistor R2, a regulation end of the adjustable precision voltage regulator D1 and one end of the resistor R3 respectively, the other end of the resistor R1 is connected with a base of the triode Q1 and an input end of the adjustable precision voltage regulator D1 respectively, and an output end of the adjustable precision voltage regulator D1 is connected with the other end of the resistor R3 and the cathode of the diode D2 respectively.

In an example embodiment, one end of the superimposed circuit is connected with the cathode of the diode D2, the other end of the superimposed circuit is connected with an over-current protection circuit, the over-current protection circuit comprises a resistor R1, a triode Q1, a triode Q2, a resistor R2, an adjustable precision voltage regulator D1 and a resistor R3, one end of the resistor R1 is connected with a power input end, a collector of the triode Q1 and a collector of the triode Q2 respectively, an emitter of the triode Q1 is connected with a base of the triode Q2 and one end of the resistor R2 respectively, an emitter of the triode Q2 is connected with the other end of the resistor R2, a regulation end of the adjustable precision voltage regulator D1 and one end of the resistor R3 respectively, the other end of the resistor R1 is connected with a base of the triode Q1 and an input end of the adjustable precision voltage regulator D1 respectively, and an output end of the adjustable precision voltage regulator D1 is connected with the other end of the resistor R3 and the superimposed circuit respectively.

In an example embodiment, the power input end of the over-current protection circuit is further connected with an LC circuit, the LC circuit comprises an inductor L1 and a capacitor C3, one end of the inductor L1 is connected with a power input end, the other end of the inductor L1 is connected with one end of the capacitor C3 and the power input end of the over-current protection circuit respectively, and the other end of the capacitor C3 is grounded.

According to another aspect of the embodiment, a front-end circuit for processing an analogue video signal and direct current power is provided, comprising a second analogue video signal passing circuit configured to block the direct current power and let the analogue video signal pass, and a second direct current power passing circuit configured to block the analogue video signal and let the direct current power pass, wherein the second analogue video signal passing circuit comprises a capacitor C11, the second direct current power passing circuit comprises a diode D11 and an inductor L3, one end of the capacitor C11 is connected with a second video signal end, the other end of the capacitor C11 is connected with one end of the inductor L3 and a cathode of the diode D11 respectively, and both the other end of the inductor L3 and an anode of the diode D11 are connected with a power input end.

In an example embodiment, the cathode of the diode D11 is further connected with a second matching circuit, the second matching circuit is a source-end matching circuit, and the source-end matching circuit comprises a Thevenin source-end matching circuit and an RC source-end matching circuit.

In an example embodiment, the anode of the diode D11 is further connected with a second superimposed circuit configured to implement high impedance to the analogue video signal, the second superimposed circuit comprises a capacitor, a triode and a resistor, and when the triode is in an amplification state, high impedance to the analogue video signal is implemented by utilizing a characteristic that the capacitor presents low impedance to an alternating current signal and adopting resistors with different resistances.

In an example embodiment, the second superimposed circuit comprises a resistor R11, a triode Q8, a resistor R10, a triode Q7, a capacitor C9 and a resistor R9, one end of the resistor R11 is connected with a power output end, one end of the resistor R10 and one end of the capacitor C9 respectively, the other end of the resistor R11 is connected with an emitter of the triode Q8, the other end of the resistor R10 is connected with a base of the triode Q8 and an emitter of the triode Q7 respectively, the other end of the capacitor C9 is connected with a base of the triode Q7 and one end of the resistor R9 respectively, and the other end of the resistor R9 is connected with a collector of the triode Q8, a collector of the triode Q7 and the anode of the diode D11 respectively.

According to another aspect of the present embodiment, a back-end circuit for processing an analogue video signal and direct current power is provided, comprising: an analogue video signal passing circuit, configured to block the direct current power and let the analogue video signal pass; and a direct current power passing circuit, connected between the direct current power and the analogue video signal passing circuit and configured to block the analogue video signal and let electric energy of the direct current power pass.

In an example embodiment, the analogue video signal passing circuit comprises a capacitor C2, the direct current power passing circuit comprises a diode D2 and an inductor L2, one end of the capacitor C2 is connected with a video signal end, the other end of the capacitor C2 is connected with one end of the inductor L2 and an anode of the diode D2 respectively, and both the other end of the inductor L2 and a cathode of the diode D2 are connected with a power input end.

According to the other aspect of the present embodiment, a front-end circuit for processing an analogue video signal and direct current power is provided, comprising: a second analogue video signal passing circuit, configured to block the direct current power and let the analogue video signal pass; and a second direct current power passing circuit, connected between the direct current power and the second analogue video signal passing circuit and configured to block the analogue video signal and let electric energy of the direct current power pass.

In an example embodiment, the second analogue video signal passing circuit comprises a capacitor C11, the second direct current power passing circuit comprises a diode D11 and an inductor L3, one end of the capacitor C11 is connected with a second video signal end, the other end of the capacitor C11 is connected with one end of the inductor L3 and a cathode of the diode D11 respectively, and both the other end of the inductor L3 and an anode of the diode D11 are connected with a power input end.

According to the other aspect of the present embodiment, a Power Over Coaxia (POC) circuit for an analogue video signal is provided, comprising a coaxial cable, wherein one end of the coaxial cable is connected with the abovementioned back-end circuit for processing the analogue video signal and the direct current power, and the other end of the coaxial cable is connected with the abovementioned front-end circuit for processing the analogue video signal and the direct current power.

According to a back-end circuit for processing an analogue video signal and a direct current power, a front-end circuit for processing an analogue video signal and a direct current power and a POC circuit for the analogue video signal provided by the disclosure, each of the back-end processing circuit and the front-end processing circuit includes an analogue video signal passing circuit configured to block the direct current power and let the analogue video signal pass and a direct current power passing circuit configured to block the analogue video signal and let the direct current power pass; when the processing circuits transmit the direct current power, the direct current power is subjected to impedance of 0 on a circuit formed by connecting the diode in parallel with the inductor and the direct current power may be directly input/output through an interface of the coaxial cable. At the same time, since the capacitor presents high impedance to the direct current power, the direct current power may be separated by the capacitor from the analogue video signal transmitted through the video signal end, and the direct current power may not influence input/output of the analogue video signal; when the processing circuits transmit the analogue video signal, the alternating current signal is subjected to low impedance because the analogue video signal is an alternating current signal and the impedance of the capacitor is relatively low, while the circuit formed by connecting the diode in parallel with the inductor presents high impedance to the analogue video signal, that is, a power end of the analogue video signal is subjected to high impedance. Therefore, the analogue video signal is isolated from the direct current power and the analogue video signal may be superimposed to the direct current power without mutual influence and exclusion to realize a function of superimposing the direct current power on an analogue video cable; and obviously, the back-end processing circuit and the front-end processing circuit are electrically connected with the two ends of the coaxial cable respectively to implement simultaneous transmission of the direct current power and the analogue video signal on the coaxial cable, so that cost is reduced, and moreover, construction time is shortened.

In order to achieve the abovementioned and related purposes, one or more aspects of the disclosure include characteristics which will be described in detail and particularly specified in the claims. The following descriptions and drawings describe some exemplary aspects of the disclosure in detail. However, these aspects merely indicate some manners in various manners to which the principle of the disclosure is available. In addition, the disclosure is intended to include all of these aspects and their equivalents.

BRIEF DESCRIPTION OF THE DRAWINGS

With reference to the following descriptions made in combination with the drawings and contents of the claims and along with more comprehensive understanding of the disclosure, other purposes and results of the disclosure may get more clear and easy to understand. In the drawings:

DETAILED DESCRIPTION OF THE EMBODIMENTS

In order to make the purposes, technical solutions and advantages of the disclosure clearer, the disclosure will be further described below with reference to specific implementation modes and the drawings in detail. It should be understood that these descriptions are only exemplary and not intended to limit the scope of the disclosure. In addition, in the following descriptions, descriptions about known structures and technologies are eliminated to avoid unnecessary confusions about concepts of the disclosure.

It is important to note that: impedance mentioned hereinafter mainly refers to electric impedance, is a complex number employing a resistance value as a real part and employing a reactance value as an imaginary part, and takes ohm as unit. Reactance includes capacitive reactance and inductive reactance. Generally, capacitance represents capacitance reactance and inductance represents inductive reactance.

Figure 1:
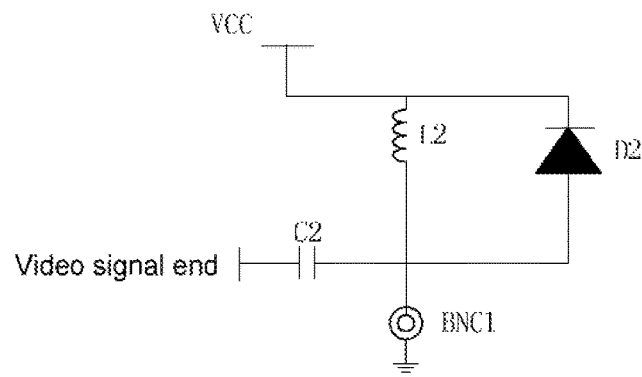
FIG. 1 is a circuit diagram of a back-end circuit for processing an analogue video signal and power according to a first implementation mode of the disclosure.

FIG. 1 is a circuit diagram of a back-end circuit for processing an analogue video signal and power according to a first implementation mode of the disclosure. The back-end processing circuit may be applied to back-end processing equipment, such as a Digital Video Recorder (DVR) in a monitoring system.

The back-end circuit for processing the analogue video signal and the direct current power includes an analogue video signal passing circuit configured to block the direct current power and let the analogue video signal pass and direct current power passing circuit configured to block the analogue video signal and let the direct current power pass, the analogue video signal passing circuit includes a capacitor C2, the direct current power passing circuit includes a diode D2 and an inductor L2, one end of the capacitor C2 is connected with a video signal end, the other end of the capacitor C2 is connected with one end of the inductor L2 and an anode of the diode D2 respectively, and both the other end of the inductor L2 and a cathode of the diode D2 are connected with a power input end.

The back-end processing circuit is electrically connected with an external coaxial cable; when the back-end processing circuit transmits the direct current power, the direct current power VCC is subjected to impedance of 0 on a circuit formed by connecting the diode D2 in parallel with the inductor L2, and the direct current power may be directly input/output through an interface of the coaxial cable. At the same time, since the capacitor C2 presents high impedance to the direct current power, the direct current power may be separated by the capacitor C2 from the analogue video signal transmitted through the video signal end, and the direct current power may not influence input of the analogue video signal; when the back-end processing circuit transmits the analogue video signal, the alternating current signal is subjected to low impedance because the analogue video signal is an alternating current signal and the impedance of the capacitor C2 is relatively low. However, the circuit formed by connecting the diode D2 in parallel with the inductor L2 presents high impedance to the analogue video signal, so that the analogue video signal is isolated from the direct current power and the analogue video signal may be superimposed to the direct current power without mutual influence and exclusion to realize a function of superimposing the direct current power on an analogue high-definition video cable; and obviously, the back-end processing circuit is electrically connected with the coaxial cable to implement simultaneous transmission of the direct current power and the analogue video signal on the coaxial cable, so that cost is reduced, and moreover, construction time is shortened, wherein the direct current power may be directly input from one end of the coaxial cable, and the coaxial interface may be BNC1.

Figure 2:
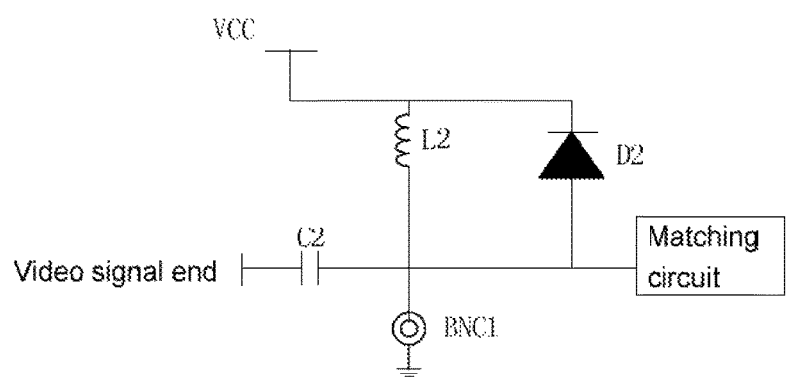
FIG. 2 is a circuit diagram of a back-end circuit for processing an analogue video signal and power according to a second implementation mode of the disclosure.

FIG. 2 is a circuit diagram of a back-end circuit for processing an analogue video signal and power according to a second implementation mode of the disclosure.

In an example embodiment, the anode of the diode D2 is further connected with a matching circuit, the matching circuit is a termination matching circuit, and the termination matching circuit includes a Thevenin termination matching circuit and an RC termination matching circuit.

The diode D2, the inductor L2, the capacitor C2 and the matching circuit form direct current power and analogue video signal superimposition core component, which mainly implements superimposition of the direct current power and the analogue video signal. A working principle of the processing circuit is that: for the direct current power, the inductor L2 is free of inductive reactance, that is, the direct current power is subjected to impedance of 0 on a circuit formed by connecting the diode D2, the inductor L2 and the matching circuit in parallel; at this moment, the capacitor C2 presents high impedance to the high direct power, so that the capacitor C2 may separate the direct current power from the analogue video signal transmitted through the video signal end, and the direct current power may not influence the input of the analogue video signal; when the back-end processing circuit is electrically connected with the external coaxial cable, the direct current power may be directly output to a front end from one end of the coaxial cable (for example, the coaxial interface BNC1, it may also be an RCA interface of course, and BNC1 is taken as an example hereinafter) and supply power to the front-end processing equipment such as a camera or a video camera; for the analogue video signal input from the coaxial interface BNC1 of the coaxial cable, since the analogue video signal is an alternating current signal and the impedance of the capacitor C2 is relatively low for the alternating current signal, the analogue video signal is subjected to low impedance in a process of input from the coaxial interface BNC1 to a video A/D conversion circuit, but is subjected to high impedance on the circuit formed by connecting the diode D2, the inductor L2 and the matching circuit in parallel. According to this working principle, the analogue video signal may be isolated from the direct current power VCC and the analogue video signal may be superimposed to the direct current power VCC without mutual influence and exclusion to realize the function of superimposing the power to an analogue high-definition video cable.

The diode D2 exists to prevent discontinuous current from causing fluctuation of voltages at two ends of the inductor. When the coaxial cable is unplugged after the back-end processing circuit is electrically connected with the external coaxial cable, energy on the inductor L2 may be released through D2.

Since a spectrum range of the analogue video signal is relatively wide, the maximum spectrum may reach dozens of megahertz or even hundreds of megahertz. When a signal of a higher frequency is superimposed to a power component, a signal integrity problem such as reflection caused by discontinuous impedance may occur to distort the analogue video signal and further influence definition of an image. After the termination matching circuit is added, signal reflection may be effectively reduced. At present, matching manners of the termination matching circuit include: a source-end series matching manner, a terminal parallel matching manner, a Thevenin matching manner, an RC network matching manner, a diode matching manner and the like, and all of these manners may achieve a terminal matching purpose.

In an example embodiment, the video signal end is further connected with a video processing circuit, the video processing circuit includes a video A/D conversion circuit and a low-pass filter, one end of the low-pass filter is connected with the video A/D conversion circuit, and the other end of the low-pass filter is connected with one end of the capacitor C2.

The video A/D conversion circuit, also called a video A/D converter, is a circuit which quantifies (discretizes) and converts an analogue quantity or a continuously changing quantity into a corresponding digital quantity.

The low-pass filter allows a signal with a frequency lower than a cutoff frequency to pass, and forbids a signal with a frequency higher than the cutoff frequency to pass. The most common low-pass filters include a Butterworth filter and a Chebyshev filter.

In an optional embodiment, the cathode of the diode D2 is further connected with a superimposed circuit configured to implement high impedance to the analogue video signal, the superimposed circuit includes a capacitor, a triode and a resistor, and when the triode is in an amplification state, high impedance to the analogue video signal is implemented by utilizing the characteristic that the capacitor presents low impedance to the alternating current signal and adopting the resistors with different resistances.

A reason for arranging the superimposed circuit is that for the inductor L2, impedance of an inductance coil is directly proportional to a frequency in case of a low frequency, but the impedance of the whole inductance coil may rapidly decrease due to existence of distributed capacitance of the inductor in case of a high frequency, that is, the impedance of the induction coil increases along with increase of the frequency at first, the impedance reaches a maximum value when arriving at a Self-Resonant Frequency (SRF) point, then the impedance rapidly decreases to 0, and when the frequency continues increasing, the induction coil may have a capacitance reactance characteristic.

When the frequency is relatively low, particularly 1,000 Hz and below, the impedance of the inductor is not enough, which may cause serious attenuation of a signal receiver in a low-frequency band to influence quality of a video. The triode of the superimposed circuit is set into the amplification state, and high impedance to the analogue video signal may be implemented through an adjustable resistor by virtue of a characteristic of the triode in an amplification area and the characteristic that the capacitor C1 presents low impedance to the alternating current signal.

Optionally, the circuit may further include: a superimposed circuit, connected between the direct current power passing circuit and the direct current power, and configured to implement high impedance to the analogue video signal, the superimposed circuit includes a capacitor, a triode and a resistor, and when the triode is in an amplification state, high impedance to the analogue video signal is implemented by utilizing the characteristic that the capacitor presents low impedance to the alternating current signal and adopting the resistors with different resistances.

Figure 3:
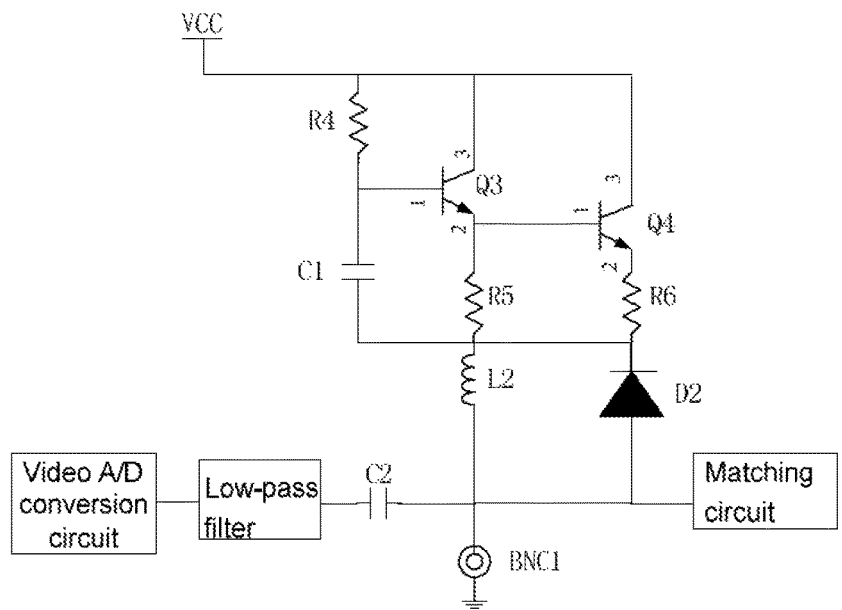
FIG. 3 is a circuit diagram of a back-end circuit for processing an analogue video signal and power according to a third implementation mode of the disclosure.

FIG. 3 is a circuit diagram of a back-end circuit for processing an analogue video signal and power according to a third implementation mode of the disclosure.

In an example embodiment, the superimposed circuit includes a resistor R4, a capacitor C1, a triode Q3, a resistor R5, a triode Q4 and a resistor R6, one end of the resistor R4 is connected with a power input end, a collector of the triode Q3 and a collector of the triode Q4 respectively, the other end of the resistor R4 is connected with one end of the capacitor C1 and a base of the triode Q3 respectively, an emitter of the triode Q3 is connected with one end of the resistor R5 and a base of the triode Q4 respectively, an emitter of the triode Q4 is connected with one end of the resistor R6, and the other end of the capacitor C1 is connected with the other end of the resistor R5, the other end of the resistor R6 and the cathode of the diode D2 respectively.

Figure 4:
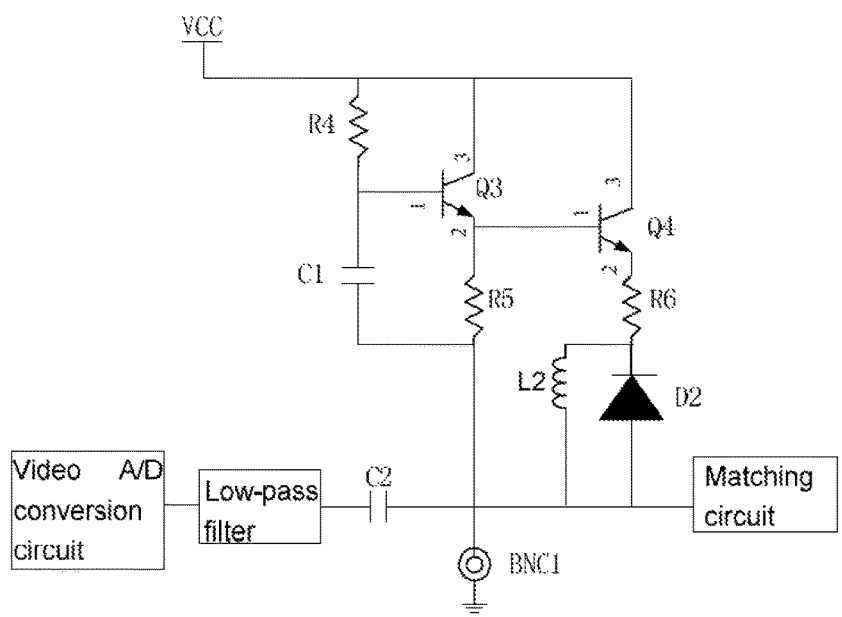
FIG. 4 is a circuit diagram of a back-end circuit for processing an analogue video signal and power according to a fourth implementation mode of the disclosure.

FIG. 4 is a circuit diagram of a back-end circuit for processing an analogue video signal and power according to a fourth implementation mode of the disclosure.

In an example embodiment, the superimposed circuit includes a resistor R4, a capacitor C1, a triode Q3, a resistor R5, a triode Q4 and a resistor R6, one end of the resistor R4 is connected with a power input end, a collector of the triode Q3 and a collector of the triode Q4 respectively, the other end of the resistor R4 is connected with one end of the capacitor C1 and a base of the triode Q3, an emitter of the triode Q3 is connected with one end of the resistor R5 and a base of the triode Q4 respectively, an emitter of the triode Q4 is connected with one end of the resistor R6, the other end of the capacitor C1 is connected with the anode of the diode D2 and the other end of the resistor R5 respectively, and the other end of the resistor R6 is connected with the cathode of the diode D2.

Figure 5:
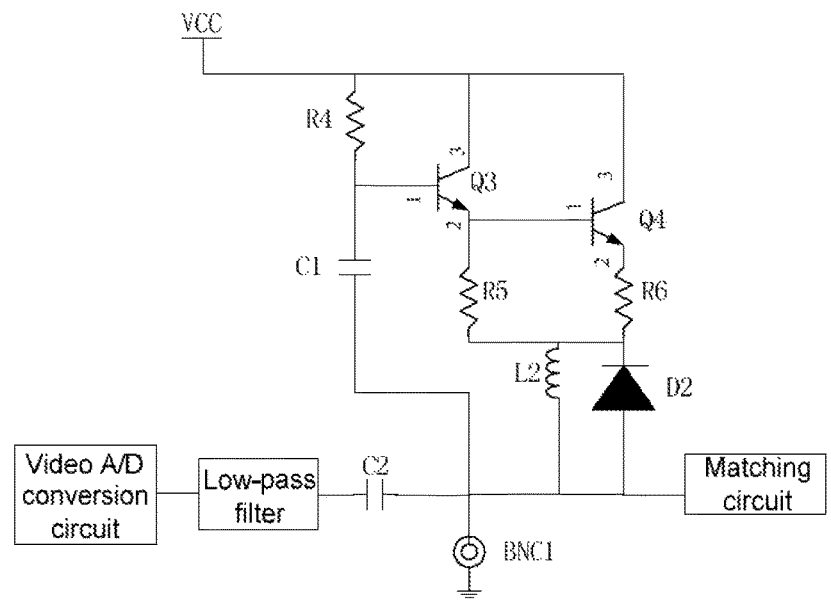
FIG. 5 is a circuit diagram of a back-end circuit for processing an analogue video signal and power according to a fifth implementation mode of the disclosure.

FIG. 5 is a circuit diagram of a back-end circuit for processing an analogue video signal and power according to a fifth implementation mode of the disclosure.

In an example embodiment, the superimposed circuit includes a resistor R4, a capacitor C1, a triode Q3, a resistor R5, a triode Q4 and a resistor R6, one end of the resistor R4 is connected with a power input end, a collector of the triode Q3 and a collector of the triode Q4 respectively, the other end of the resistor R4 is connected with one end of the capacitor C1 and a base of the triode Q3 respectively, an emitter of the triode Q3 is connected with one end of the resistor R5 and a base of the triode Q4 respectively, an emitter of the triode Q4 is connected with one end of the resistor R6, the other end of the capacitor C1 is connected with the anode of the diode D2, and the other end of the resistor R5 is connected with the other end of the resistor R6 and the cathode of the diode D2 respectively.

A working principle of the superimposed circuit is that: an external offset parameter is set to position the triode Q3 and the triode Q4 in the amplification area to make a voltage of pin 3 of the triode Q4 higher than a voltage of pin 1 and make the voltage of pin 1 higher than a voltage of pin 2, and then power supply current flows to the inductor L2 through pin 3 and pin 2 of the triode Q4 after being amplified by the triode Q3 and the triode Q4; but for the analogue video signal, since the analogue video signal is an alternating current signal and the capacitor C1 presents low impedance, by virtue of the characteristic of the triode in the amplification area (current flowing through pin 1 and pin 2 of the triode determines current flowing through pin 3 and pin 2) and high impedance of the resistor R5, the current flowing through the triode Q3 and the triode Q4 is extremely low and negligible, and impedance subjected by the analogue video signal which passes through the superimposed circuit is approximately equal to the resistance of R4; and resistance of the resistor R4 may be set to achieve the purpose of high impedance of the analogue video signal. The resistor R4 is a K-level resistor.

Figure 6:
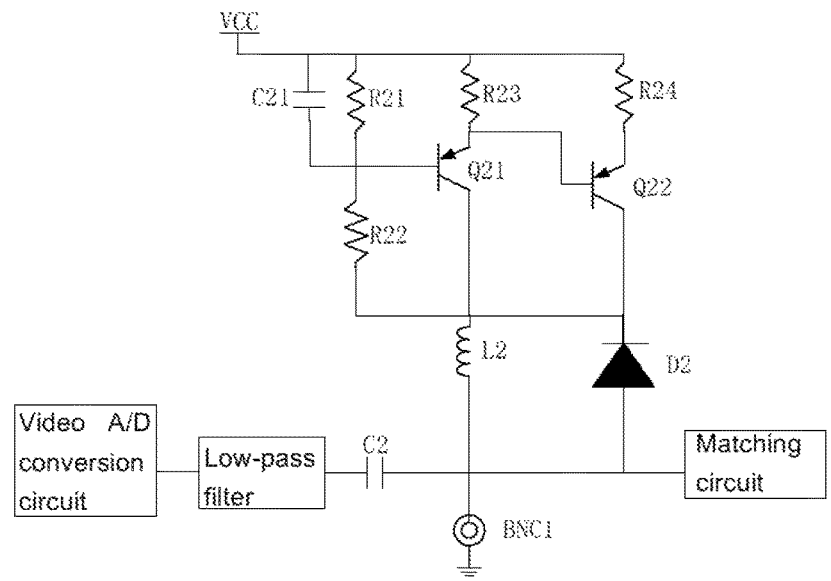
FIG. 6 is a circuit diagram of a back-end circuit for processing an analogue video signal and power according to a sixth implementation mode of the disclosure.

FIG. 6 is a circuit diagram of a back-end circuit for processing an analogue video signal and power according to a sixth implementation mode of the disclosure.

In an example embodiment, the superimposed circuit includes a capacitor C21, a resistor R21, a resistor R23, a resistor R24, a triode Q21, a triode Q22 and a resistor R22, one end of the capacitor C21 is connected with a power input end, one end of the resistor R21, one end of the resistor R23 and one end of the resistor R24 respectively, the other end of the capacitor C21 is connected with the other end of the resistor R21, a base of the triode Q21 and one end of the resistor R22 respectively, an emitter of the triode Q21 is connected with the other end of the resistor R23 and a base of the triode Q22 respectively, an emitter of the triode Q22 is connected with the other end of the resistor R24, and the other end of the resistor R22 is connected with a collector of the triode Q21, a collector of the triode Q22 and the cathode of the diode D2 respectively.

The impedance to the analogue video signal which passes through the superimposed circuit is approximately equal to the resistance of R22. Resistance of the resistor R22 may be set to achieve the purpose of high impedance to the analogue video signal. The resistor R22 is a K-level resistor.

In an example embodiment, the cathode of the diode D2 is further connected with an over-current protection circuit, the over-current protection circuit includes a resistor R1, a triode Q1, a triode Q2, a resistor R2, an adjustable precision voltage regulator D1 and a resistor R3, one end of the resistor R1 is connected with a power input end, a collector of the triode Q1 and a collector of the triode Q2 respectively, an emitter of the triode Q1 is connected with a base of the triode Q2 and one end of the resistor R2 respectively, an emitter of the triode Q2 is connected with the other end of the resistor R2, a regulation end of the adjustable precision voltage regulator D1 and one end of the resistor R3 respectively, the other end of the resistor R1 is connected with a base of the triode Q1 and an input end of the adjustable precision voltage regulator D1 respectively, and an output end of the adjustable precision voltage regulator D1 is connected with the other end of the resistor R3 and the cathode of the diode D2 respectively.

The over-current protection circuit monitors output current of a power supply module in real time, and when the output current is excessively high, may timely cut off input of the power and protect safety of the whole circuit system.

Figure 7:
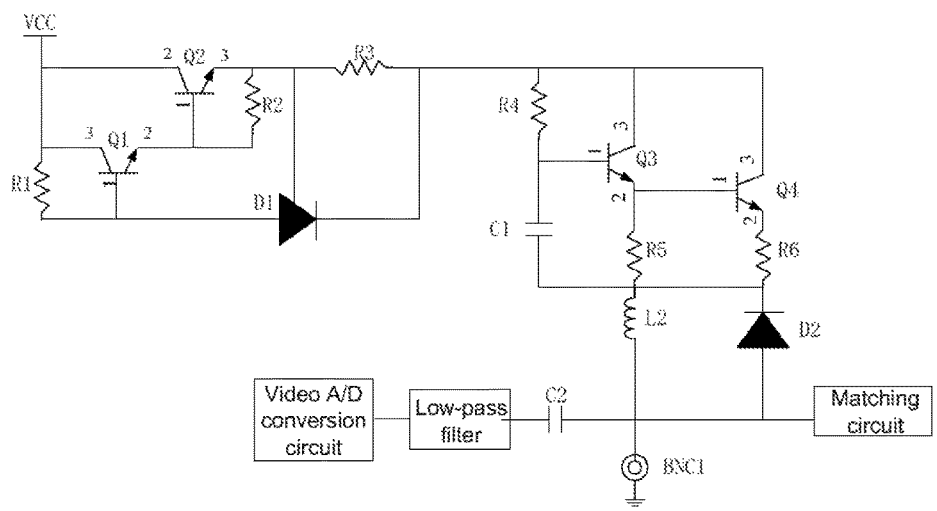
FIG. 7 is a circuit diagram of a back-end circuit for processing an analogue video signal and power according to a seventh implementation mode of the disclosure.

FIG. 7 is a circuit diagram of a back-end circuit for processing an analogue video signal and power according to a seventh implementation mode of the disclosure.

In an example embodiment, one end of the superimposed circuit is connected with the cathode of the diode D2, the other end of the superimposed circuit is connected with an over-current protection circuit, the over-current protection circuit includes a resistor R1, a triode Q1, a triode Q2, a resistor R2, an adjustable precision voltage regulator D1 and a resistor R3, one end of the resistor R1 is connected with a power input end, a collector of the triode Q1 and a collector of the triode Q2 respectively, an emitter of the triode Q1 is connected with a base of the triode Q2 and one end of the resistor R2 respectively, an emitter of the triode Q2 is connected with the other end of the resistor R2, a regulation end of the adjustable precision voltage regulator D1 and one end of the resistor R3 respectively, the other end of the resistor R1 is connected with a base of the triode Q1 and an input end of the adjustable precision voltage regulator D1 respectively, and an output end of the adjustable precision voltage regulator D1 is connected with the other end of the resistor R3 and the superimposed circuit respectively.

VCC is the direct current power, and because the adjustable precision voltage regulator D1 is not switched on after power on, a voltage of pin 1 of the triode Q1 is higher than a voltage of pin 2, the triode Q1 is switched on, pin 2 of the triode Q1 is approximately high-voltage VCC and higher than a voltage of pin 3 of the triode Q2, and the triode Q2 is completely switched on to start externally supplying power.

When current flowing through the resistor R3 exceeds a certain value, a voltage at the two ends of the resistor R3 increases, and when the voltage at the two ends of the resistor R3 exceeds a certain value, the adjustable precision voltage regulator D1 is switched on, the voltage of pin 1 of the triode Q1 is lower than the voltage of pin 2, the triode Q1 is cut off, the triode Q2 is cut off, and power supply of VCC is stopped.

Figure 8:
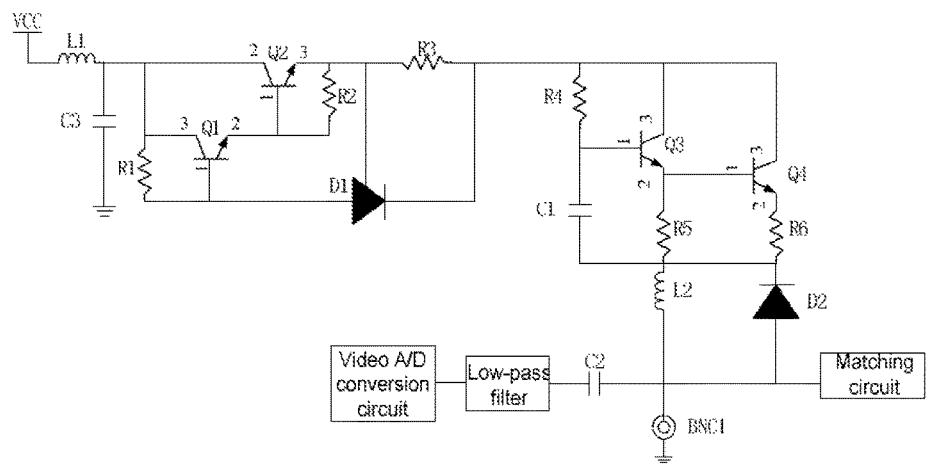
FIG. 8 is a circuit diagram of a back-end circuit for processing an analogue video signal and power according to an eighth implementation mode of the disclosure.

FIG. 8 is a circuit diagram of a back-end circuit for processing an analogue video signal and power according to an eighth implementation mode of the disclosure.

In an example embodiment, the power input end of the over-current protection circuit is further connected with an LC circuit, the LC circuit includes an inductor L1 and a capacitor C3, one end of the inductor L1 is connected with a power input end, the other end of the inductor L1 is connected with one end of the capacitor C3 and the power input end of the over-current protection circuit respectively, and the other end of the capacitor C3 is grounded.

VCC is the direct current power, and the inductor L1 and the capacitor C3 form the LC circuit to realize a slow power-on function of the power.

Figure 9:
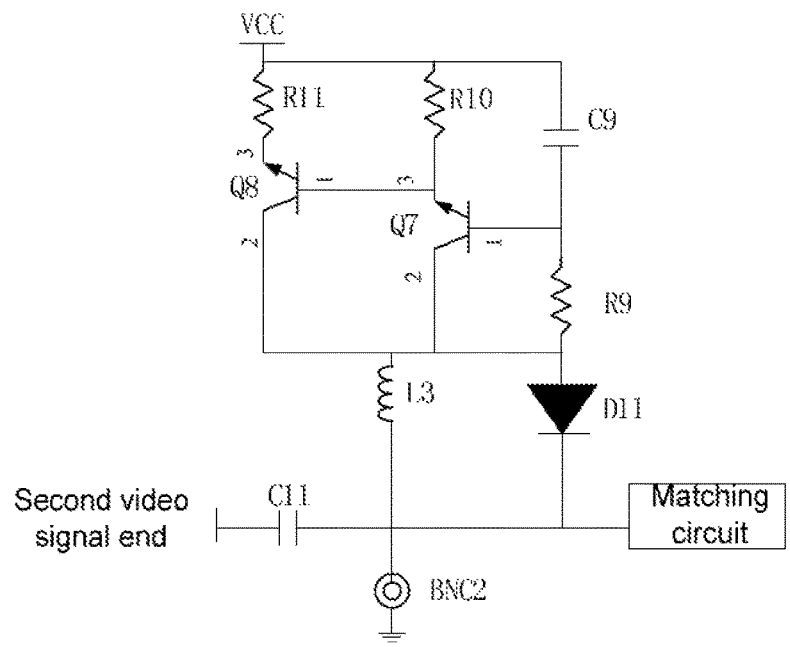
FIG. 9 is a circuit diagram of a front-end circuit for processing an analogue video signal and power according to a ninth implementation mode of the disclosure.

FIG. 9 is a circuit diagram of a front-end circuit for processing an analogue video signal and power according to a ninth implementation mode of the disclosure. The front-end processing circuit may be applied to front-end processing equipment, such as video source acquisition equipment in a monitoring system, including a camera and a video camera.

The front-end circuit for processing the analogue video signal and the direct current power includes a second analogue video signal passing circuit configured to block the direct current power and let the analogue video signal pass and a second direct current power passing circuit configured to block the analogue video signal and let the direct current power pass, the second analogue video signal passing circuit includes a capacitor C11, the second direct current power passing circuit includes a diode D11 and an inductor L3, one end of the capacitor C11 is connected with a second video signal end, the other end of the capacitor C11 is connected with one end of the inductor L3 and a cathode of the diode D11 respectively, and both the other end of the inductor L3 and an anode of the diode D11 are connected with a power input end.

The front-end processing circuit is electrically connected with an external coaxial cable, and when the front-end processing circuit is connected with the direct current power, the direct current power is subjected to impedance of 0 on a circuit formed by connecting the diode D11 and the inductor L3 in parallel, and the direct current power may be directly output from an interface of the coaxial cable; at this moment, the capacitor C11 presents high impedance to the high direct power, so that the capacitor C11 may separate the direct current power from the output analogue video signal, and input of the direct current power may not influence output of the analogue video signal; when the processing circuit transmits the analogue video signal, the alternating current signal is subjected to low impedance because the analogue video signal is an alternating current signal and the impedance presented by the capacitor C11 is relatively low, while the circuit formed by connecting the diode D11 in parallel with the inductor L3 presents high impedance to the analogue video signal, so that the analogue video signal is isolated from the direct current power and the analogue video signal may be superimposed to the direct current power without mutual influence and exclusion to realize a function of superimposing the direct current power on an analogue high-definition video cable; and obviously, the front-end processing circuit is electrically connected with the coaxial cable to implement simultaneous transmission of the direct current power and the analogue video signal on the coaxial cable, so that cost is reduced, and moreover, construction time is shortened.

In an example embodiment, the cathode of the diode D11 is further connected with a second matching circuit, the second matching circuit is a source-end matching circuit, and the source-end matching circuit includes a Thevenin source-end matching circuit and an RC source-end matching circuit.

In an example embodiment, the anode of the diode D11 is further connected with a second superimposed circuit configured to implement high impedance to the analogue video signal, the second superimposed circuit includes a capacitor, a triode and a resistor, and when the triode is in an amplification state, high impedance to the analogue video signal is implemented by utilizing the characteristic that the capacitor presents low impedance to the alternating current signal and adopting the resistors with different resistances.

In an optional embodiment, the second superimposed circuit includes a resistor R11, a triode Q8, a resistor R10, a triode Q7, a capacitor C9 and a resistor R9, one end of the resistor R11 is connected with a power output end, one end of the resistor R10 and one end of the capacitor C9 respectively, the other end of the resistor R11 is connected with an emitter of the triode Q8, the other end of the resistor R10 is connected with a base of the triode Q8 and an emitter of the triode Q7 respectively, the other end of the capacitor C9 is connected with a base of the triode Q7 and one end of the resistor R9 respectively, and the other end of the resistor R9 is connected with a collector of the triode Q8, a collector of the triode Q7 and the anode of the diode D11 respectively.

A working principle of the front-end circuit for processing an analogue video signal and power is substantially the same as the working principle of the back-end circuit for processing the analogue video signal and the direct current power. In the superimposed circuit formed by the resistor R11, the triode Q8, the resistor R10, the triode Q7, the capacitor C9 and the resistor R9, the triode Q7 and the triode Q8 are also set to be amplification areas. The capacitor C9 presents low impedance to the analogue video signal, and then, due to the characteristic of the triode in the amplification area and existence of R10 (high resistance), current flowing through the triode Q7 and the triode Q8 is extremely low and negligible, and the impedance of the circuit to the analogue video signal is approximately equal to the resistance of R9; and resistance of the resistor R9 may be set to achieve the purpose of high impedance of the analogue video signal. The resistor R9 is also a K-level resistor.

The front-end circuit for processing the analogue video signal and the direct current power is a part of a camera-end circuit, and the back-end circuit for processing the analogue video signal and the direct current power is a part of a DVR-end circuit. The direct current power passes through the back-end circuit for processing the analogue video signal and the direct current power from the DVR-end circuit, reaches an interface of the coaxial cable (for example, a BNC1 interface, BNC1 is taken as an example hereinafter), and reaches the other interface of the coaxial cable (for example, a BNC2 interface, BNC2 is taken as an example hereinafter) after passing through the coaxial cable, a signal output from the BNC2 interface reaches the camera-end circuit of a receiving end through the front-end circuit for processing the analogue video signal and the direct current power. The analogue video signal is output from a camera end, reaches the BNC1 interface of the coaxial cable through the BNC2 interface of the coaxial cable and the coaxial cable after passing through the capacitor C11 configured to block the direct current power, after direct current power blocking, filtering, matching and the like, reaches the video A/D conversion circuit to implement superimposition of a video and the power on the same coaxial cable.

Figure 10:
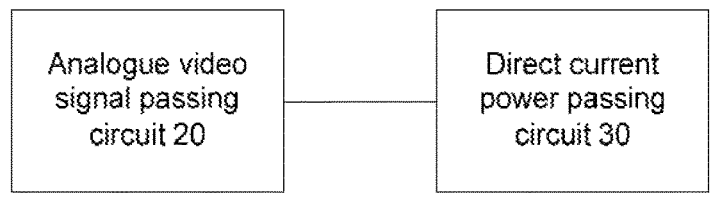
FIG. 10 is a structure diagram of a back-end circuit for processing an analogue video signal and power according to a tenth implementation mode of the disclosure.

FIG. 10 is a structure diagram of a back-end circuit for processing an analogue video signal and power according to a tenth implementation mode of the disclosure.

An analogue video signal passing circuit 20 is configured to block the direct current power and let the analogue video signal pass.

A direct current power passing circuit 30 is connected between the direct current power and the analogue video signal passing circuit, and is configured to block the analogue video signal and let electric energy of the direct current power pass.

In an example embodiment, the analogue video signal passing circuit includes a capacitor C2, the direct current power passing circuit includes a diode D2 and an inductor L2, one end of the capacitor C2 is connected with a video signal end, the other end of the capacitor C2 is connected with one end of the inductor L2 and an anode of the diode D2 respectively, and both the other end of the inductor L2 and a cathode of the diode D2 are connected with a power input end.

Figure 11:
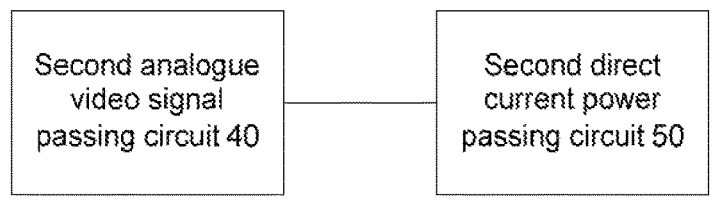
FIG. 11 is a structure diagram of a front-end circuit for processing an analogue video signal and power according to an eleventh implementation mode of the disclosure.

FIG. 11 is a structure diagram of a back-end circuit for processing an analogue video signal and power according to an eleventh implementation mode of the disclosure.

A second analogue video signal passing circuit 40 is configured to block the direct current power and let the analogue video signal pass.

A second direct current power passing circuit 50 is connected between the direct current power and the second analogue video signal passing circuit, and is configured to block the analogue video signal and let electric energy of the direct current power pass.

In an example embodiment, the second analogue video signal passing circuit includes a capacitor C11, the second direct current power passing circuit includes a diode D11 and an inductor L3, one end of the capacitor C11 is connected with a second video signal end, the other end of the capacitor C11 is connected with one end of the inductor L3 and a cathode of the diode D11 respectively, and both the other end of the inductor L3 and an anode of the diode D11 are connected with a power input end.

Figure 12:
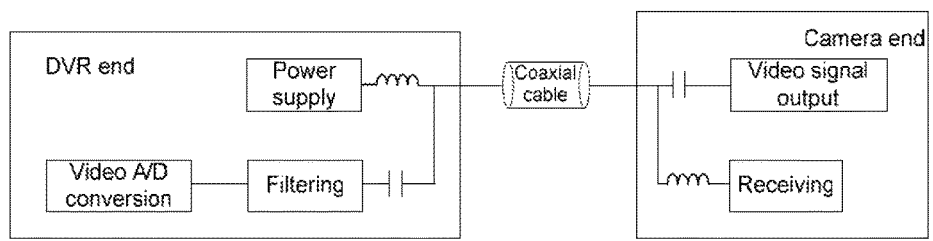
FIG. 12 is a structure block diagram of a POC circuit for an analogue video signal according to a twelfth implementation mode of the disclosure.

FIG. 12 is a structure block diagram of a POC circuit for an analogue video signal according to a twelfth implementation mode of the disclosure.

The POC circuit for the analogue video signal includes a coaxial cable, one end (optionally a BNC1 end) of the coaxial cable is connected with the abovementioned back-end circuit for processing the analogue video signal and direct current power, and the other end (optionally a BNC2 end) of the coaxial cable is connected with the abovementioned front-end circuit for processing the analogue video signal and direct current power. The back-end circuit for processing the analogue video signal and the direct current power and the front-end circuit for processing the analogue video signal and the direct current power refer to the abovementioned embodiment, and will not be specifically described herein.

In a monitoring product system, a DVR plays a dominant role for a long time. However, compared with a Network Video Recorder (NVR) capable of realizing functions of power supply and communication through a POE interface by virtue of a network cable, the DVR is required to independently supply power to a video camera or a camera to bring inconvenience to cabling when being connected with the video camera or the camera.

POC is a technology based on a coaxial-cable-based video, coaxial control and power superimposition.

According to the disclosure, differences between the direct current power and the analogue video signal in the spectrum range are utilized, and the power, the analogue video signal and other signals may be transmitted through the one coaxial cable. When a coaxial technology is adopted to transmit the analogue video signal and simultaneously transmit the power and data, so that the cost may be considerably reduced, and the construction time may be shortened. Such a power and signal superimposition technology is simple, economical and effective, and has broad application prospect in practical products and projects.

For the abovementioned circuits, those skilled in the art may also adopt different circuit connection manners and components with different parameters to realize the corresponding functions of each circuit under the technical background of the technical solution according to common general knowledge, which will not be elaborated with examples herein.

The disclosure is intended to protect the back-end circuit for processing the analogue video signal and the direct current power, the front-end circuit for processing the analogue video signal and the direct current power and the POC circuit for the analogue video signal, and the back-end processing circuit and the front-end processing circuit are electrically connected with the two ends of the coaxial cable respectively to implement simultaneous transmission of the direct current power and the analogue video signal on the one coaxial cable, so that the cost is reduced, and moreover, the construction time is shortened.

It should be understood that the specific implementation modes of the disclosure are only adopted to exemplary describe or explain the principle of the disclosure and not intended to form limits to the disclosure. Therefore, any modifications, equivalent replacements, improvements and the like made without departing from the spirit and scope of the disclosure shall fall within the scope of protection of the disclosure. In addition, the claims appended to the disclosure are intended to cover all variations and modifications falling within the scope and boundary of the appended claims or equivalent forms of the scope and boundary.

The invention claimed is:

1. A back-end circuit for processing an analogue video signal and direct current power, comprising:
   an analogue video signal passing circuit configured to block the direct current power and let the analogue video signal pass; and
   a direct current power passing circuit configured to block the analogue video signal and let the direct current power pass,
   wherein the analogue video signal passing circuit comprises a capacitor C2, the direct current power passing circuit comprises a diode D2 and an inductor L2, one end of the capacitor C2 is connected with a video signal end, the other end of the capacitor C2 is connected with one end of the inductor L2 and an anode of the diode D2 respectively, and both the other end of the inductor L2 and a cathode of the diode D2 are connected with a power input end,
   wherein the back-end circuit further comprises a superimposed circuit, connected between the direct current power passing circuit and the direct current power, and configured to implement high impedance to the analogue video signal, wherein the superimposed circuit comprises a capacitor, a triode and a resistor, and when the triode is in an amplification state, high impedance to the analogue video signal is implemented by utilizing a characteristic that the capacitor presents low impedance to an alternating current signal and adopting resistors with different resistances.

2. The processing circuit as claimed in claim 1, wherein the anode of the diode D2 is further connected with a matching circuit, the matching circuit is a termination matching circuit, and the termination matching circuit comprises a Thevenin termination matching circuit and an RC termination matching circuit.

3. The processing circuit as claimed in claim 1, wherein the video signal end is further connected with a video processing circuit, the video processing circuit comprises a video Analogue/Digital (A/D) conversion circuit and a low-pass filter, one end of the low-pass filter is connected with the video A/D conversion circuit, and the other end of the low-pass filter is connected with one end of the capacitor C2.

4. The processing circuit as claimed in claim 1, wherein the cathode of the diode D2 is further connected with a superimposed circuit configured to implement high impedance to the analogue video signal, the superimposed circuit comprises a capacitor, a triode and a resistor, and when the triode is in an amplification state, high impedance to the analogue video signal is implemented by utilizing a characteristic that the capacitor presents low impedance to an alternating current signal and adopting resistors with different resistances.

5. The processing circuit as claimed in claim 4, wherein the superimposed circuit comprises a resistor R4, a capacitor C1, a triode Q3, a resistor R5, a triode Q4 and a resistor R6, one end of the resistor R4 is connected with a power input end, a collector of the triode Q3 and a collector of the triode Q4 respectively, the other end of the resistor R4 is connected with one end of the capacitor C1 and a base of the triode Q3 respectively, an emitter of the triode Q3 is connected with one end of the resistor R5 and a base of the triode Q4 respectively, an emitter of the triode Q4 is connected with one end of the resistor R6, and the other end of the capacitor C1 is connected with the other end of the resistor R5, the other end of the resistor R6 and the cathode of the diode D2 respectively.

6. The processing circuit as claimed in claim 4, wherein the superimposed circuit comprises a resistor R4, a capacitor C1, a triode Q3, a resistor R5, a triode Q4 and a resistor R6, one end of the resistor R4 is connected with a power input end, a collector of the triode Q3 and a collector of the triode Q4 respectively, the other end of the resistor R4 is connected with one end of the capacitor C1 and a base of the triode Q3, an emitter of the triode Q3 is connected with one end of the resistor R5 and a base of the triode Q4 respectively, an emitter of the triode Q4 is connected with one end of the resistor R6, the other end of the capacitor C1 is connected with the anode of the diode D2 and the other end of the resistor R5 respectively, and the other end of the resistor R6 is connected with the cathode of the diode D2.

7. The processing circuit as claimed in claim 4, wherein the superimposed circuit comprises a resistor R4, a capacitor C1, a triode Q3, a resistor R5, a triode Q4 and a resistor R6, one end of the resistor R4 is connected with a power input end, a collector of the triode Q3 and a collector of the triode Q4 respectively, the other end of the resistor R4 is connected with one end of the capacitor C1 and a base of the triode Q3 respectively, an emitter of the triode Q3 is connected with one end of the resistor R5 and a base of the triode Q4 respectively, an emitter of the triode Q4 is connected with one end of the resistor R6, the other end of the capacitor C1 is connected with the anode of the diode D2, and the other end of the resistor R5 is connected with the other end of the resistor R6 and the cathode of the diode D2 respectively.

8. The processing circuit as claimed in claim 4, wherein the superimposed circuit comprises a capacitor C21, a resistor R21, a resistor R23, a resistor R24, a triode Q21, a triode Q22 and a resistor R22, one end of the capacitor C21 is connected with a power input end, one end of the resistor R21, one end of the resistor R23 and one end of the resistor R24 respectively, the other end of the capacitor R21 is connected with the other end of the resistor R21, a base of the triode Q21 and one end of the resistor R22 respectively, an emitter of the triode Q21 is connected with the other end of the resistor R23 and a base of the triode Q22 respectively, an emitter of the triode Q22 is connected with the other end of the resistor R24, and the other end of the resistor R22 is connected with a collector of the triode Q21, a collector of the triode Q22 and the cathode of the diode D2 respectively.

9. The processing circuit as claimed in claim 1, wherein the cathode of the diode D2 is further connected with an over-current protection circuit, the over-current protection circuit comprises a resistor R1, a triode Q1, a triode Q2, a resistor R2, an adjustable precision voltage regulator D1 and a resistor R3, one end of the resistor R1 is connected with a power input end, a collector of the triode Q1 and a collector of the triode Q2 respectively, an emitter of the triode Q1 is connected with a base of the triode Q2 and one end of the resistor R2 respectively, an emitter of the triode Q2 is connected with the other end of the resistor R2, a regulation end of the adjustable precision voltage regulator D1 and one end of the resistor R3 respectively, the other end of the resistor R1 is connected with a base of the triode Q1 and an input end of the adjustable precision voltage regulator D1 respectively, and an output end of the adjustable precision voltage regulator D1 is connected with the other end of the resistor R3 and the cathode of the diode D2 respectively.

10. The processing circuit as claimed in claim 4, wherein one end of the superimposed circuit is connected with the cathode of the diode D2, the other end of the superimposed circuit is connected with an over-current protection circuit, the over-current protection circuit comprises a resistor R1, a triode Q1, a triode Q2, a resistor R2, an adjustable precision voltage regulator D1 and a resistor R3, one end of the resistor R1 is connected with a power input end, a collector of the triode Q1 and a collector of the triode Q2 respectively, an emitter of the triode Q1 is connected with a base of the triode Q2 and one end of the resistor R2 respectively, an emitter of the triode Q2 is connected with the other end of the resistor R2, a regulation end of the adjustable precision voltage regulator D1 and one end of the resistor R3 respectively, the other end of the resistor R1 is connected with a base of the triode Q1 and an input end of the adjustable precision voltage regulator D1 respectively, and an output end of the adjustable precision voltage regulator D1 is connected with the other end of the resistor R3 and the superimposed circuit respectively.

11. The processing circuit as claimed in claim 9, wherein the power input end of the over-current protection circuit is further connected with an LC circuit, the LC circuit comprises an inductor L1 and a capacitor C3, one end of the inductor L1 is connected with a power input end, the other end of the inductor L1 is connected with one end of the capacitor C3 and the power input end of the over-current protection circuit respectively, and the other end of the capacitor C3 is grounded.

12. A front-end circuit for processing an analogue video signal and direct current power, comprising:
a second analogue video signal passing circuit configured to block the direct current power and let the analogue video signal pass; and
a second direct current power passing circuit configured to block the analogue video signal and let the direct current power pass,
wherein the second analogue video signal passing circuit comprises a capacitor C11, the second direct current power passing circuit comprises a diode D11 and an inductor L3, one end of the capacitor C11 is connected with a second video signal end, the other end of the capacitor C11 is connected with one end of the inductor L3 and a cathode of the diode D11 respectively, and both the other end of the inductor L3 and an anode of the diode D11 are connected with a power input end;
wherein the anode of the diode D11 is further connected with a second superimposed circuit configured to implement high impedance to the analogue video signal, the second superimposed circuit comprises a capacitor, a triode and a resistor, and when the triode is in an amplification state, high impedance to the analogue video signal is implemented by utilizing a characteristic that the capacitor presents low impedance to an alternating current signal and adopting resistors with different resistances.

13. The processing circuit as claimed in claim 12, wherein the cathode of the diode D11 is further connected with a second matching circuit, the second matching circuit is a source-end matching circuit, and the source-end matching circuit comprises a Thevenin source-end matching circuit and an RC source-end matching circuit.

14. The processing circuit as claimed in claim 12, wherein the second superimposed circuit comprises a resistor R11, a triode Q8, a resistor R10, a triode Q7, a capacitor C9 and a resistor R9, one end of the resistor R11 is connected with a power output end, one end of the resistor R10 and one end of the capacitor C9 respectively, the other end of the resistor R11 is connected with an emitter of the triode Q8, the other end of the resistor R10 is connected with a base of the triode Q8 and an emitter of the triode Q7 respectively, the other end of the capacitor C9 is connected with a base of the triode Q7 and one end of the resistor R9 respectively, and the other end of the resistor R9 is connected with a collector of the triode Q8, a collector of the triode Q7 and the anode of the diode D11 respectively.

15. The processing circuit as claimed in claim 1, wherein the superimposed circuit comprises a resistor R4, a capacitor C1, a triode Q3, a resistor R5, a triode Q4 and a resistor R6, one end of the resistor R4 is connected with a power input end, a collector of the triode Q3 and a collector of the triode Q4 respectively, the other end of the resistor R4 is connected with one end of the capacitor C1 and a base of the triode Q3 respectively, an emitter of the triode Q3 is connected with one end of the resistor R5 and a base of the triode Q4 respectively, an emitter of the triode Q4 is connected with one end of the resistor R6, and the other end of the capacitor C1 is connected with the other end of the resistor R5, the other end of the resistor R6 and the cathode of the diode D2 respectively.

16. The processing circuit as claimed in claim 1, wherein the superimposed circuit comprises a resistor R4, a capacitor C1, a triode Q3, a resistor R5, a triode Q4 and a resistor R6, one end of the resistor R4 is connected with a power input end, a collector of the triode Q3 and a collector of the triode Q4 respectively, the other end of the resistor R4 is connected with one end of the capacitor C1 and a base of the triode Q3, an emitter of the triode Q3 is connected with one end of the resistor R5 and a base of the triode Q4 respectively, an emitter of the triode Q4 is connected with one end of the resistor R6, the other end of the capacitor C1 is connected with the anode of the diode D2 and the other end of the resistor R5 respectively, and the other end of the resistor R6 is connected with the cathode of the diode D2.

* * * * *